(12) United States Patent
Kawamura

(10) Patent No.: US 12,628,805 B2
(45) Date of Patent: May 19, 2026

(54) REEL SEAT FOR FISHING ROD, HANDLE MEMBER FOR FISHING ROD, AND FISHING ROD

(71) Applicant: GLOBERIDE, Inc., Tokyo (JP)

(72) Inventor: Takuji Kawamura, Tokyo (JP)

(73) Assignee: GLOBERIDE, INC., Tokyo (JP)

( * ) Notice: Subject to any disclaimer, the term of this patent is extended or adjusted under 35 U.S.C. 154(b) by 203 days.

(21) Appl. No.: 17/912,774

(22) PCT Filed: Dec. 8, 2020

(86) PCT No.: PCT/JP2020/045603
§ 371 (c)(1),
(2) Date: Apr. 27, 2023

(87) PCT Pub. No.: WO2021/192431
PCT Pub. Date: Sep. 30, 2021

(65) Prior Publication Data
US 2023/0309524 A1 Oct. 5, 2023

(30) Foreign Application Priority Data

Mar. 27, 2020 (JP) ................................. 2020-057576

(51) Int. Cl.
*A01K 87/06* (2006.01)
*A01K 87/08* (2006.01)
(52) U.S. Cl.
CPC .............. *A01K 87/06* (2013.01); *A01K 87/08* (2013.01)
(58) Field of Classification Search
CPC ......... A01K 87/06; A01K 87/08; A01K 87/00

USPC ................................. 43/23, 22, 18.1 R, 18.5
See application file for complete search history.

(56) References Cited

U.S. PATENT DOCUMENTS

| | | | |
|---|---|---|---|
| 2,145,612 | A | 1/1939 | Scogland et al. |
| 2,780,883 | A * | 2/1957 | Macy ..................... A01K 87/06 43/22 |
| 2,814,147 | A | 11/1957 | Henshaw |
| 4,222,192 | A | 9/1980 | Jacobson |
| 4,403,439 | A | 9/1983 | Wallace |

(Continued)

FOREIGN PATENT DOCUMENTS

| | | |
|---|---|---|
| CN | 1385066 A | 12/2002 |
| CN | 1606910 A | 4/2005 |

(Continued)

OTHER PUBLICATIONS

International Search Report for related International Application No. PCT/JP2020/045603; report dated Sep. 30, 2021; (5 pages).

(Continued)

*Primary Examiner* — William L Gmoser
(74) *Attorney, Agent, or Firm* — Oliff PLC

(57) ABSTRACT
An object of the present disclosure is to provide a fishing rod reel seat, a fishing rod handle member including the reel seat, and a fishing rod including the fishing rod reel seat and the fishing rod handle member, which are lightweight and hardly attenuate vibration from a rod body. A fishing rod handle member according to an embodiment of the present invention is formed by integrally molding a reel seat main body having a reel leg placing portion on which a reel leg is placed and a grip connected to the reel seat main body.

11 Claims, 15 Drawing Sheets

(56) References Cited

U.S. PATENT DOCUMENTS

| | | | | |
|---|---|---|---|---|
| 4,520,587 | A * | 6/1985 | Wallace | A01K 87/06 |
| | | | | 43/18.5 |
| 4,750,287 | A | 6/1988 | Myers | |
| 4,885,865 | A * | 12/1989 | Rumbaugh | A01K 87/00 |
| | | | | 43/18.5 |
| 4,920,682 | A * | 5/1990 | Andreasen | A01K 87/08 |
| | | | | 43/22 |
| 5,115,591 | A | 5/1992 | Oyama | |
| 5,638,870 | A | 6/1997 | Takada et al. | |
| 5,875,581 | A * | 3/1999 | Yasui | A01K 87/06 |
| | | | | 43/22 |
| 6,029,389 | A | 2/2000 | Newton et al. | |
| 6,105,302 | A * | 8/2000 | Yamamoto | A01K 87/08 |
| | | | | 43/23 |
| 6,286,244 | B1 * | 9/2001 | Weiss | A01K 87/04 |
| | | | | 43/18.1 R |
| 6,339,896 | B1 * | 1/2002 | Akiba | A01K 87/002 |
| | | | | 43/18.1 R |
| 6,973,750 | B1 * | 12/2005 | Kim | A01K 87/08 |
| | | | | 43/23 |
| 11,266,137 | B1 * | 3/2022 | Miller | A01K 87/00 |
| 2002/0017050 | A1 | 2/2002 | Irrgang et al. | |
| 2005/0055865 | A1 * | 3/2005 | Markley | A01K 87/02 |
| | | | | 43/18.1 R |
| 2007/0193105 | A1 | 8/2007 | Miller et al. | |
| 2009/0013584 | A1 | 1/2009 | Selfors | |
| 2013/0255131 | A1 | 10/2013 | Abbey et al. | |
| 2014/0173967 | A1 | 6/2014 | Iwata et al. | |
| 2015/0181851 | A1 | 7/2015 | Akiba et al. | |
| 2016/0044903 | A1 | 2/2016 | Grahl | |
| 2017/0280695 | A1 | 10/2017 | Kawamura | |
| 2018/0020649 | A1 | 1/2018 | Kotarsky | |
| 2019/0166816 | A1 | 6/2019 | Iwata | |
| 2020/0352149 | A1 | 11/2020 | Iwata et al. | |
| 2021/0259228 | A1 * | 8/2021 | Hutchins, Jr. | B25G 1/06 |
| 2023/0072935 | A1 | 3/2023 | Kawamura | |
| 2023/0082885 | A1 | 3/2023 | Kawamura | |
| 2023/0363367 | A1 | 11/2023 | Kawamura | |

FOREIGN PATENT DOCUMENTS

| | | | |
|---|---|---|---|
| CN | 104737996 A | 7/2015 | |
| CN | 106342767 A | 1/2017 | |
| CN | 107439501 A | 12/2017 | |
| JP | S27-000081 Y1 | 1/1952 | |
| JP | S51-3989 A | 1/1976 | |
| JP | 59110575 U | 7/1984 | |
| JP | 1984110575 U | 7/1984 | |
| JP | 861224921 A | 10/1986 | |
| JP | 02046292 U | 3/1990 | |
| JP | H03-129062 U | 12/1991 | |
| JP | H04-49961 U | 4/1992 | |
| JP | H05-276854 A | 10/1993 | |
| JP | H07-327557 A | 12/1995 | |
| JP | H10215734 A | 8/1998 | |
| JP | H11137132 A | 5/1999 | |
| JP | 2000342125 A | 12/2000 | |
| JP | 2013021923 A | 2/2013 | |
| TW | 550047 B | 9/2003 | |

OTHER PUBLICATIONS

Written Opinion for related International Application No. PCT/JP2020/045603; report dated Sep. 30, 2021; (4 pages).

Office Action for related Taiwanese Application No. 110103274; action dated Oct. 19, 2021; (13 pages).

Office Action for related Taiwanese Application No. 110103274; action dated Jul. 5, 2022; (12 pages).

First Chinese Office Action issued Apr. 22, 2023, Chinese Application No. 202080099048.6, pp. 1-16.

Preliminary Report on Patentability for related International Application No. PCT/JP2020/045603; action dated Sep. 22, 2022; (9 pages).

Japanese Office Action in connection with Japanese Patent Application No. 2020-057576; action dated Dec. 13, 2022; (7 pages).

Mar. 5, 2024 Extended European Search Report issued in European Patent Application No. 20926750.9.

Dec. 16, 2024 Office Action issued in Korean Application No. 10-2022-7036965.

Dec. 12, 2023 Office Action issued in Japanese Patent Application No. 2020-183348.

Apr. 23, 2024 Office Action issued in Japanese Patent Application No. 2020-183348.

May 22, 2024 Office Action issued in Chinese Patent Application No. 202180052598.7.

Jun. 5, 2024 Office Action issued in Australian Patent Application No. 2021372000.

Aug. 14, 2024 Restriction Requirement issued in U.S. Appl. No. 18/033,551.

Sep. 27, 2024 Office Action issued in U.S. Appl. No. 18/033,551.

Dec. 7, 2021 International Search Report issued in International Patent Application No. PCT/JP2021/033643.

Dec. 7, 2021 Written Opinion issued in International Patent Application No. PCT/JP2021/033643.

Dec. 30, 2024 Office Action issued in Chinese Patent Application No. 202180052598.7.

Mar. 5, 2025 Office Action issued in U.S. Appl. No. 18/033,551.

Mar. 6, 2025 Office Action issued in Chinese Patent Application No. 202180052598.7.

Mar. 21, 2025 Notice of Preliminary Rejection issued in Korean Patent Application No. 10-2023-7006489.

Sep. 11, 2023 Examination Report issued in Great British Patent Application No. 2304969.5.

May 2, 2023 International Preliminary Report on Patentability issued in International Patent Application No. PCT/JP2021/033643.

Sep. 4, 2025 Office Action issued in Singaporean Patent Application No. 11202302624Y.

Sep. 17, 2025 Office Action issued in U.S. Appl. No. 18/033,551.

* cited by examiner

REEL SEAT FOR FISHING ROD, HANDLE MEMBER FOR FISHING ROD, AND FISHING ROD

CROSS-REFERENCE TO RELATED APPLICATION

The present application is a National Stage of International Application No. PCT/JP2020/045603 filed on Dec. 8, 2020, which claims priority to and the benefit of Japanese Patent Application No. 2020-057576, filed on Mar. 27, 2020, the disclosures of which are incorporated herein by reference in their entirety.

FIELD

The present disclosure relates to a fishing rod reel seat, a fishing rod handle member including the reel seat, and a fishing rod including the fishing rod reel seat and the fishing rod handle member.

BACKGROUND

Conventionally, various fishing rods each including a fishing rod reel seat and a grip have been known.

In such a fishing rod, a fishing rod reel seat and a fishing rod grip are usually placed on a rod body, and a reel leg placing portion for placing a reel leg on an upper side or a lower side of a main body is formed on the fishing rod reel seat.

As such a fishing rod, for example, Patent Literature 1 discloses a fishing rod including: a rod body; a cylindrical reinforcing resin layer formed on a circumferential surface of the rod body and having an uneven surface formed on an outer periphery thereof; and a reel seat injection-molded on an outer circumferential surface of the reinforcing resin layer.

In addition, Patent Literature 2 discloses a fishing rod including a rear grip portion on a rear side of a reel seat including a cylindrical reel seat main body having a reel leg placing portion on which a leg portion of a reel is placed, the fishing rod including: a rod main body; and a rear grip rod body in which a rear grip portion is integrally formed by increasing the diameter of a rear portion of a hollow rod body at a diameter change rate larger than a diameter change rate of the rod main body at the time of forming the hollow rod body from a prepreg, in which a rear portion of the rod main body and a front portion of the rear grip rod body are overlapped and joined integrally with each other inside and outside so as to form an overlapping portion having a predetermined length, and at least a part of the overlapping portion is located inside the reel seat main body.

CITATION LIST

Patent Literature

Patent Literature 1: JP H11-137132 A
Patent Literature 2: JP 2013-21923 A

SUMMARY

However, in the fishing rod disclosed in Patent Literature 1, since a solid reel seat injection-molded on the outer circumferential surface of the reinforcing resin layer is disposed on the cylindrical reinforcing resin layer in the rod body, the weight increases. In addition, the reel seat has a thickness, and therefore functions as a cushioning material, which significantly reduces sensitivity of the fishing rod disadvantageously.

In addition, also in the fishing rod disclosed in Patent Literature 2, since the rear grip rod body and the reel seat main body are joined to the rod main body, an increase in weight for adhesion is inevitable, and since an adhesion portion and a plurality of layers are interposed, these function as a cushioning material, which significantly reduces sensitivity of the fishing rod disadvantageously.

The present disclosure has been made in view of the above circumstances, and an object of the present disclosure is to provide a fishing rod reel seat, a fishing rod handle member including the reel seat, and a fishing rod including the fishing rod reel seat and the fishing rod handle member, which are lightweight and hardly attenuate vibration from a rod body. Other objects of the present disclosure will become apparent by reference to the entire specification.

A fishing rod handle member according to an embodiment of the present disclosure is formed by integrally molding a reel seat main body having a reel leg placing portion on which a reel leg is placed and a grip connected to the reel seat main body.

In the fishing rod handle member according to the embodiment of the present disclosure, the fishing rod handle member is formed in a hollow shape.

In the fishing rod handle member according to the embodiment of the present disclosure, the fishing rod handle member is made of carbon fiber-reinforced plastic.

In the fishing rod handle member according to the embodiment of the present disclosure, an end portion of a rod body for a fishing rod is attached to one end portion of the reel seat main body on a side opposite to the grip.

In the fishing rod handle member according to the embodiment of the present disclosure, the end portion of the reel seat main body has a length of 20 to 50 mm.

In the fishing rod handle member according to the embodiment of the present disclosure, carbon fibers of the carbon fiber-reinforced plastic are continuously formed in a longitudinal direction of the fishing rod handle portion member.

A fishing rod according to an embodiment of the present disclosure includes the above fishing rod handle member and a rod body.

A fishing rod reel seat main body according to an embodiment of the present disclosure has a rod body for a fishing rod attached to one end and having a fishing rod grip attached to the other end, includes a reel leg placing portion on which a reel leg is placed, and is integrally molded as a whole.

According to the above embodiment, it is possible to provide a fishing rod reel seat, a fishing rod handle member including the reel seat, and a fishing rod including the fishing rod reel seat and the fishing rod handle member, which are lightweight and hardly attenuate vibration from a rod body.

DETAILED DESCRIPTION

Figure 1A:
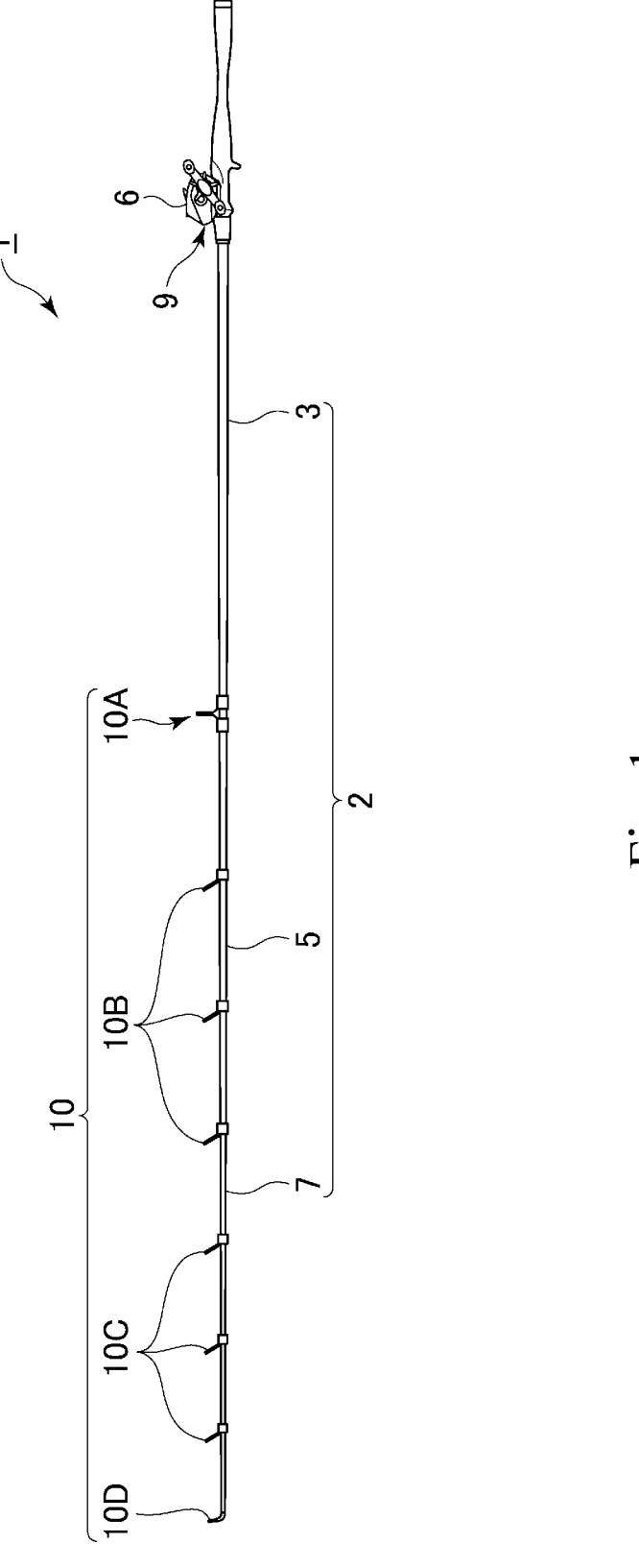
FIG. 1*a* is a view illustrating a fishing rod according to an embodiment of the present disclosure.

Hereinafter, an embodiment of a fishing rod according to the present disclosure will be specifically described with reference to the attached drawings. Components common in the plurality of drawings are denoted by the same reference numerals throughout the plurality of drawings. It should be noted that the drawings are not necessarily drawn to scale for convenience of description.

Figure 1B:
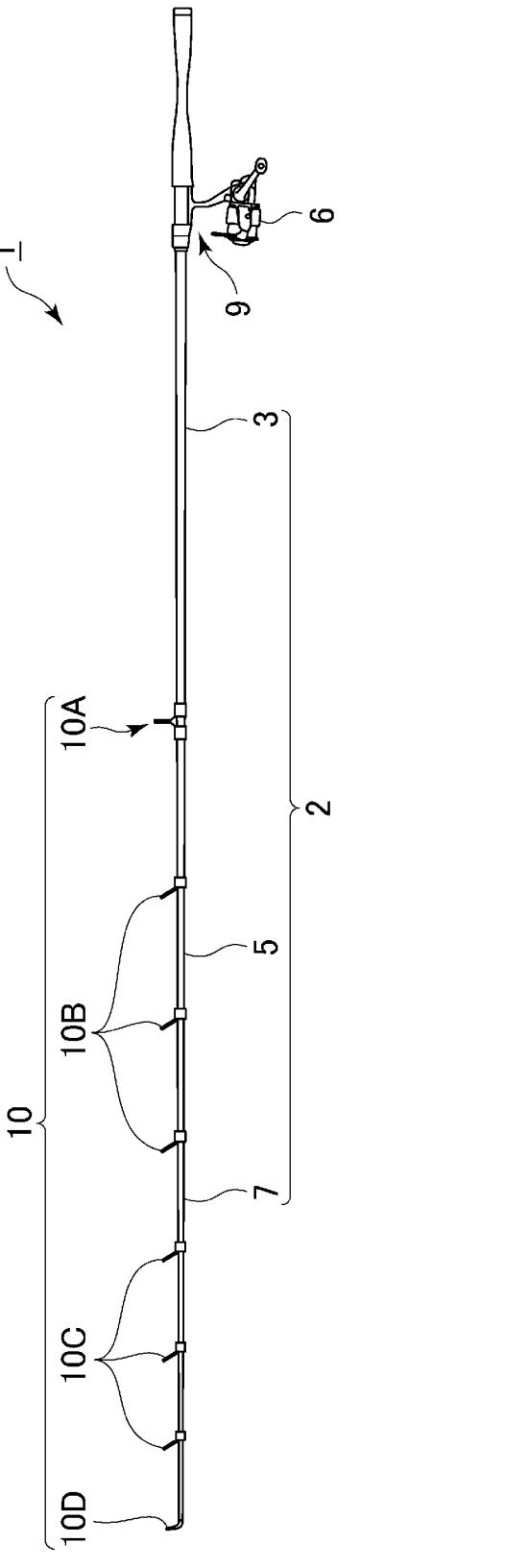
FIG. 1*b* is a view illustrating the fishing rod according to the embodiment of the present disclosure.

FIGS. 1*a* and 1*b* are views illustrating the embodiment of the fishing rod according to the present disclosure. As illustrated in the drawings, a fishing rod 1 according to the embodiment of the present disclosure includes a rod body 2, a reel R attached to the rod body 2 via a reel seat 9, and a fishing line guide 10 attached to the rod body 2. In the illustrated embodiment, each of the reel seat 9 and the fishing line guide 10 corresponds to an attachment component attached to an outer circumferential surface of the rod body. In FIG. 1*a*, a bait reel is disposed as the reel R, and on the other hand, in FIG. 1*b*, a spinning reel is disposed as the reel R, but these are examples.

The rod body 2 is configured by, for example, connecting a base rod 3, a middle rod 5, a tip rod 7, and the like. Each of these rod bodies is joined together, for example, in an ordinarily jointed type. The base rod 3, the middle rod 5, and the tip rod 7 may be joined together in a telescopic type, an inversely jointed type, a socket-and-spigot jointed type, or any other known joining style. The rod body 2 may be formed of a single rod body.

The base rod 3, the middle rod 5, and the tip rod 7 are each made of, for example, a tubular body made of a fiber-reinforced resin. This tubular body made of a fiber-reinforced resin is formed by winding a fiber-reinforced resin prepreg (prepreg sheet) in which reinforcing fibers are impregnated with a matrix resin around a core metal, and heating and curing the prepreg sheet. As the reinforcing fibers contained in the prepreg sheet, for example, carbon fibers, glass fibers, and any other known reinforcing fibers can be used. As the matrix resin contained in the prepreg sheet, a thermosetting resin such as an epoxy resin can be used. After the prepreg sheet is cured, the core metal is removed. An outer surface of the tubular body is appropriately polished. Each of the rod bodies may be formed in a solid state.

In the illustrated embodiment, the base rod 3, the middle rod 5, and the tip rod 7 include a plurality of fishing line guides 10 (fishing line guides 10A to 10D) for guiding a fishing line fed from the reel 6 attached to the reel seat 9. More specifically, the base rod 3 includes the fishing line guide 10A, the middle rod 5 includes the fishing line guide 10B, and the tip rod 7 includes the fishing line guide 10C. The tip rod 7 includes the top guide 10D at a tip thereof, but details thereof are omitted.

Next, the reel seat main body 12 and the reel seat 9 will be described with reference to FIG. 2. The reel seat main body 12 includes the reel seat main body 12 having a reel leg placing surface 12*a* on which a reel leg 6*a* of the fishing reel 6 is placed in an axial direction thereof. The reel seat main body 12 is formed in a cylindrical shape as a whole. The reel seat main body 12 can have a length of 60 to 160 mm, for example, but is not limited thereto.

In addition, the reel seat main body 12 has a grip portion 12*b* obtained by slightly swelling an opposite side of the reel leg placing surface 12*a* and having a curved outer surface that is easily gripped by being supported with a thenar or the vicinity thereof when the grip portion 12*b* is gripped with a gripping hand.

Figure 2:
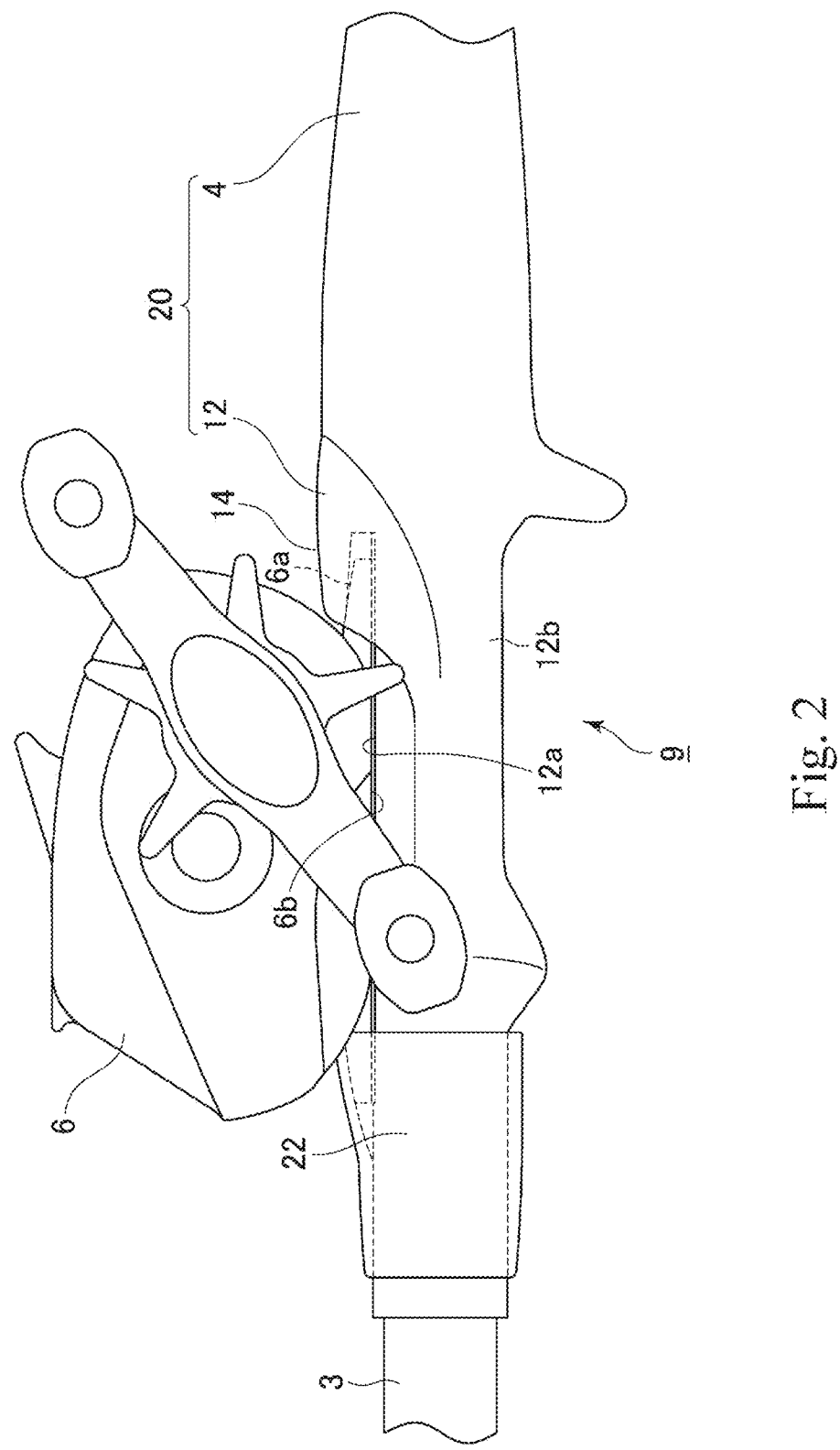
FIG. 2 is a view illustrating a fishing rod reel seat according to the embodiment of the present disclosure.

The reel leg placing surface 12*a* of the reel seat main body 12 can be formed flat or substantially flat with a curvature larger than that of another circumferential portion (for example, the grip portion 12*b*) adjacent to the reel leg placing surface 12*a* of the reel seat main body 12, and is formed so as to extend in an axial direction of the reel seat main body 12 illustrated in FIG. 2. A fixing hood 14 is integrally disposed at one end (rod base side) of the reel seat main body 12. One end of the reel leg placing surface 12*a* of the reel seat main body 12 is disposed inside the fixing hood 14.

A moving hood 22 is attached to the other end (rod tip side) of the reel seat main body 12 so as to be movable in an axial direction. The reel seat 9 may include the reel seat main body 12 and the moving hood 22, but details thereof are omitted.

Figure 3:
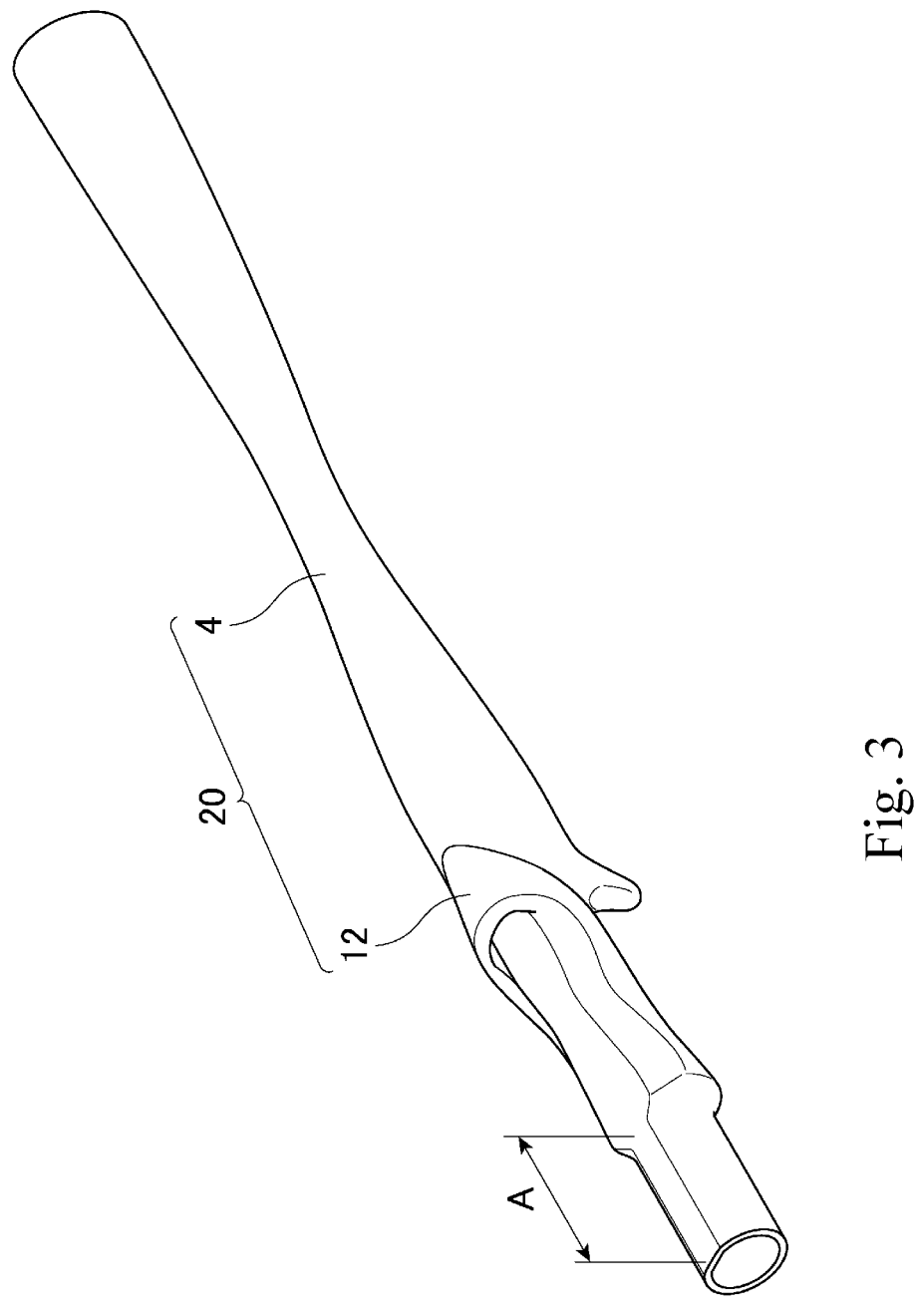
FIG. 3 is a view illustrating a fishing rod handle member according to the embodiment of the present disclosure.

Next, a fishing rod handle member 20 according to the embodiment of the present disclosure will be described with reference to FIG. 3 (and FIG. 2). Here, the fishing rod handle member 20 includes the reel seat main body 12 described above and a grip 4 formed adjacent to the reel seat main body 12. Note that the fishing rod handle member 20 may include the reel seat 9 described above and the grip 4. However, in the present embodiment, the fishing rod handle member 20 is defined as described above.

As illustrated in the drawings, the fishing rod handle member 20 according to the embodiment of the present disclosure is formed by integrally molding the reel seat main body 12 having the reel leg placing portion 12a on which the reel leg 6b is placed and the grip 4 connected to the reel seat main body 12.

The fishing rod handle member 20 according to the embodiment of the present disclosure can significantly reduce the weight because the handle member is integrally molded, can reduce attenuation of vibration from the rod body due to the integral molding, and therefore can improve sensitivity of the fishing rod.

Next, the fishing rod handle member 20 according to the embodiment of the present disclosure will be described with reference to FIGS. 4a and 4b. As illustrated in the drawings, in the fishing rod handle member 20 according to the embodiment of the present disclosure, the fishing rod handle member is formed in a hollow shape. In this way, it is possible to significantly reduce the weight without affecting sensitivity imparted to the fishing rod.

In the fishing rod handle member 20 according to the embodiment of the present disclosure, the fishing rod handle member 20 is made of carbon fiber-reinforced plastic (CFRP). As described above, the fishing rod handle member 20 may be made of CFRTP (continuous fiber), CFRTP (discontinuous fiber), or a hybrid thereof. Since the fishing rod handle member 20 is made of such a material, it is possible to suppress an increase in weight while ensuring sufficient rigidity and strength as the handle member 20 used for the fishing rod.

Figure 4A:
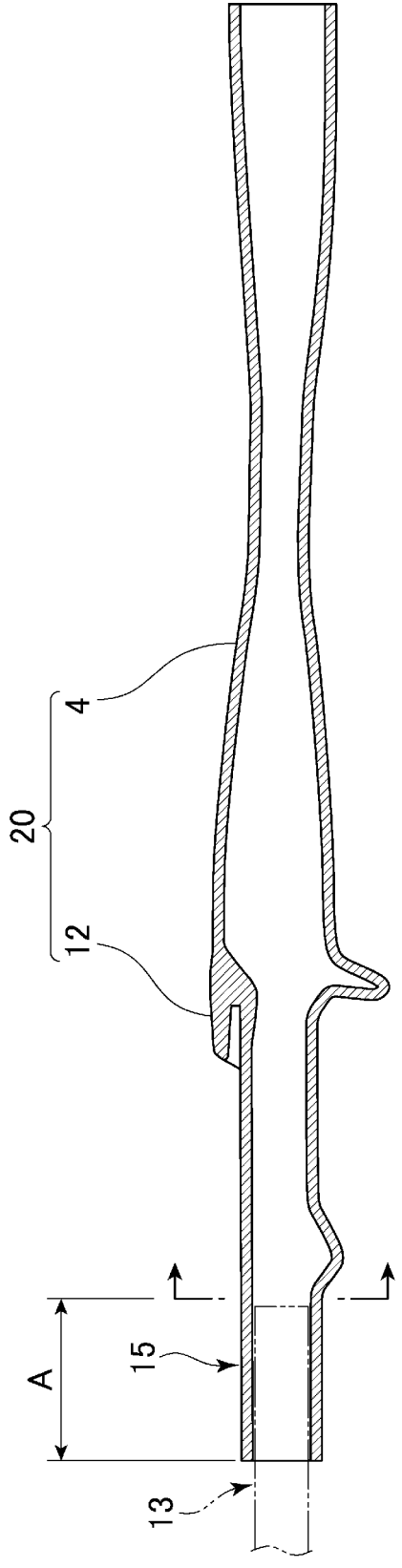
FIG. 4*a* is a view illustrating the fishing rod handle member according to the embodiment of the present disclosure.
Figure 4B:
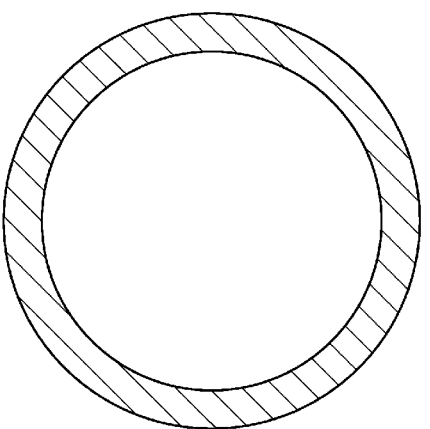
FIG. 4*b* is a view illustrating a cross section of the fishing rod handle member according to the embodiment of the present disclosure.

As illustrated in FIGS. 4a and 4b, in the fishing rod handle member 20 according to the embodiment of the present disclosure, an end portion 13 of the rod body for a fishing rod 3 is attached to one end portion 15 of the reel seat main body 12 on a side opposite to the grip 4. With this configuration, unlike many conventional methods, it is not necessary to cause the rod body to pass through the entire or substantially the entire fishing rod handle member 20. Therefore, the weight can be significantly reduced.

In the fishing rod handle member 20 according to the embodiment of the present disclosure, the end portion 15 of the reel seat main body 12 has a length (A) of 20 to 50 mm. With this configuration, as described above, it is not necessary to cause the rod body to pass through the entire or substantially the entire fishing rod handle member 20. Therefore, the weight can be significantly reduced.

Here, as a method for attaching the end portion 13 of the rod body for a fishing rod 3 to the fishing rod handle member 20, for example, fitting (press-fitting), bonding, or fastening is conceivable, but the method is not limited thereto. The attachment methods described above have an advantage that attachment and detachment between the rod body and the handle member is easier.

Next, the fishing rod handle member 20 according to the embodiment of the present disclosure will be described with reference to FIGS. 5a to 5c. As illustrated in the drawings, in the fishing rod handle member 20 according to the embodiment of the present disclosure, the fishing rod handle member is formed in a hollow shape, but the fishing rod handle member 20 may include a circumferential rib 23 in an area where the end portion 13 of the rod body for a fishing rod 3 is attached to the one end portion 15 of the reel seat main body 12 on a side opposite to the grip 4. In this way, it is possible to significantly reduce the weight without affecting sensitivity imparted to the fishing rod and to enhance rigidity (crushing rigidity) in a circumferential direction.

Figure 5A:
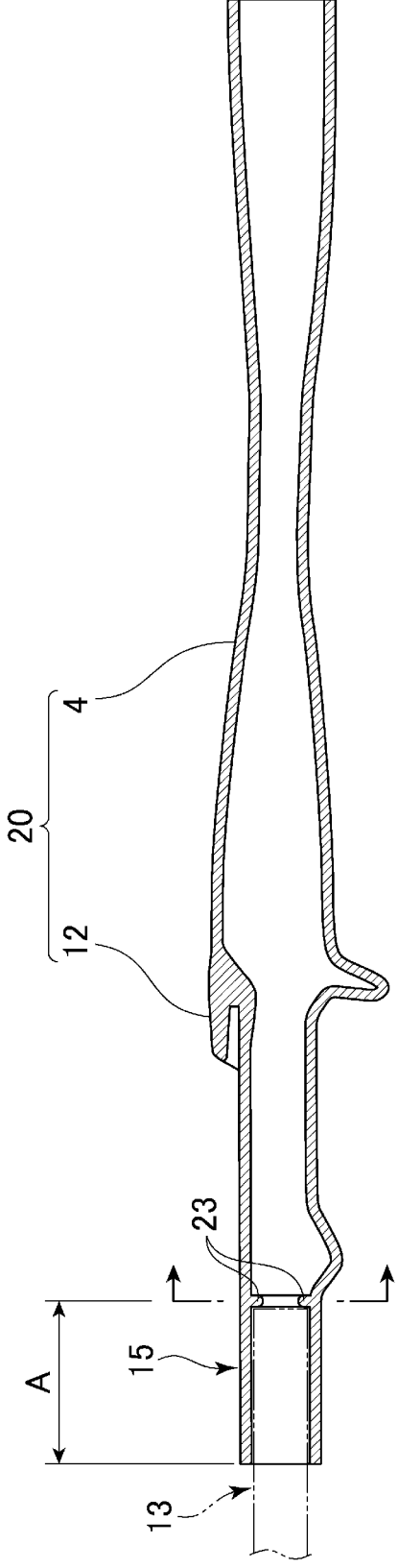
FIG. 5*a* is a view illustrating the fishing rod handle member according to the embodiment of the present disclosure.
Figure 5B:
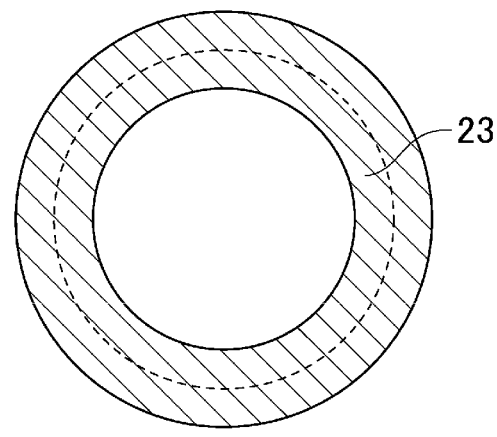
FIG. 5*b* is a view illustrating a cross section of the fishing rod handle member according to the embodiment of the present disclosure.
Figure 5C:
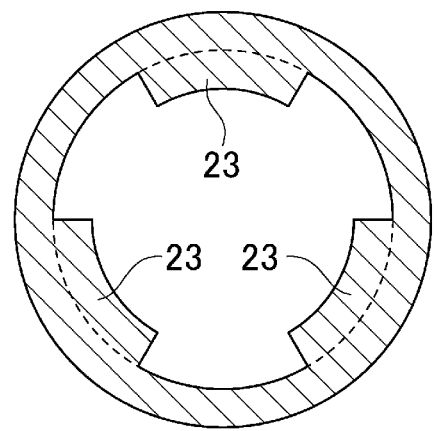
FIG. 5*c* is a view illustrating a cross section of the fishing rod handle member according to the embodiment of the present disclosure.

FIGS. 5b and 5c each illustrate a cross-sectional shape of the circumferential rib 23 in FIG. 5a. As illustrated in FIG. 5b, the circumferential rib 23 is disposed so as to make one turn around an inner surface of the reel seat main body 12. Meanwhile, as illustrated in FIG. 5c, the circumferential rib 23 may be intermittently disposed on the inner surface of the reel seat main body 12 (in the illustrated example, three circumferential ribs 23 are disposed). Various aspects are conceivable for the position, number, shape, and structure of the circumferential rib 23, and the aspect of the circumferential rib 23 is not limited the above aspects.

Next, the fishing rod handle member 20 according to the embodiment of the present disclosure will be described with reference to FIGS. 6a to 6c. As illustrated in the drawings, in the fishing rod handle member 20 according to the embodiment of the present disclosure, the fishing rod handle member is formed in a hollow shape, but the fishing rod handle member 20 may include a circumferential wall 24 in an area where the end portion 13 of the rod body for a fishing rod 3 is attached to the one end portion 15 of the reel seat main body 12 on a side opposite to the grip 4. In this way, it is possible to significantly reduce the weight without affecting sensitivity imparted to the fishing rod and to enhance rigidity (crushing rigidity) in a circumferential direction.

Figure 6A:
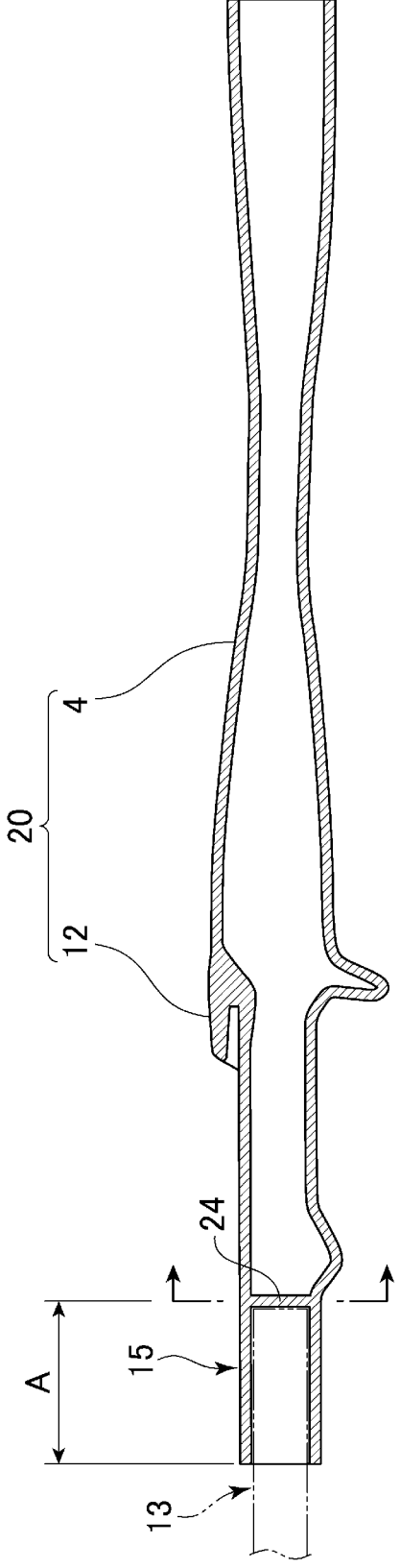
FIG. 6*a* is a view illustrating the fishing rod handle member according to the embodiment of the present disclosure.
Figure 6B:
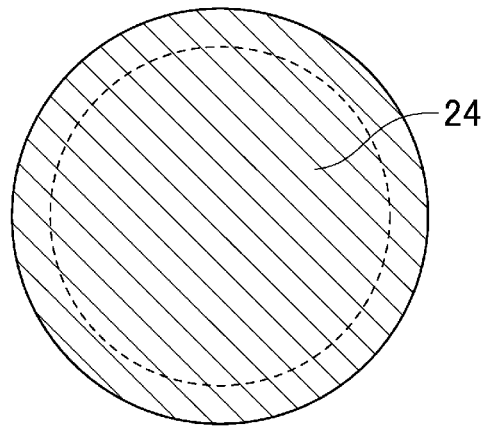
FIG. 6*b* is a view illustrating a cross section of the fishing rod handle member according to the embodiment of the present disclosure.
Figure 6C:
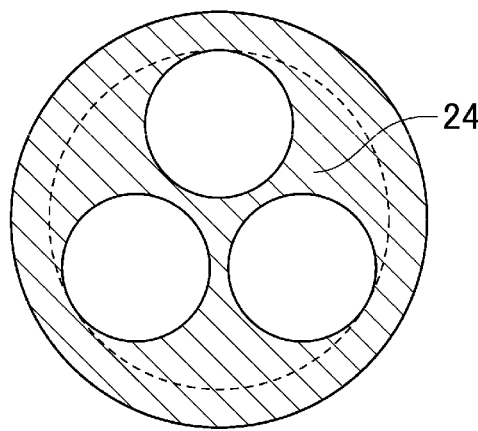
FIG. 6*c* is a view illustrating a cross section of the fishing rod handle member according to the embodiment of the present disclosure.

FIGS. 6b and 6c each illustrate a cross-sectional shape of the circumferential wall 24 in FIG. 6a. As illustrated in FIG. 6b, the circumferential wall 24 is disposed so as to form a wall on an inner surface of the reel seat main body 12. Meanwhile, as illustrated in FIG. 6c, the circumferential wall 24 may be formed so as to have some through-holes on the inner surface of the reel seat main body 12 (in the illustrated example, three circular holes are formed in the circumferential wall 24). Various aspects are conceivable for the position, number, shape, and structure of the circumferential wall 24, and the aspect of the circumferential wall 24 is not limited the above aspects.

Next, the fishing rod handle member 20 according to the embodiment of the present disclosure will be described with reference to FIGS. 7a to 7c. As illustrated in the drawings, in the fishing rod handle member 20 according to the embodiment of the present disclosure, the fishing rod handle member is formed in a hollow shape, but the fishing rod handle member 20 may include an axial rib 25 extending in a longitudinal direction of the reel seat main body 12 from an area where the end portion 13 of the rod body for a fishing rod 3 is attached to the one end portion 15 of the reel seat main body 12 on a side opposite to the grip 4 in the area. In this way, it is possible to significantly reduce the weight without affecting sensitivity imparted to the fishing rod and to enhance bending rigidity.

Figure 7A:
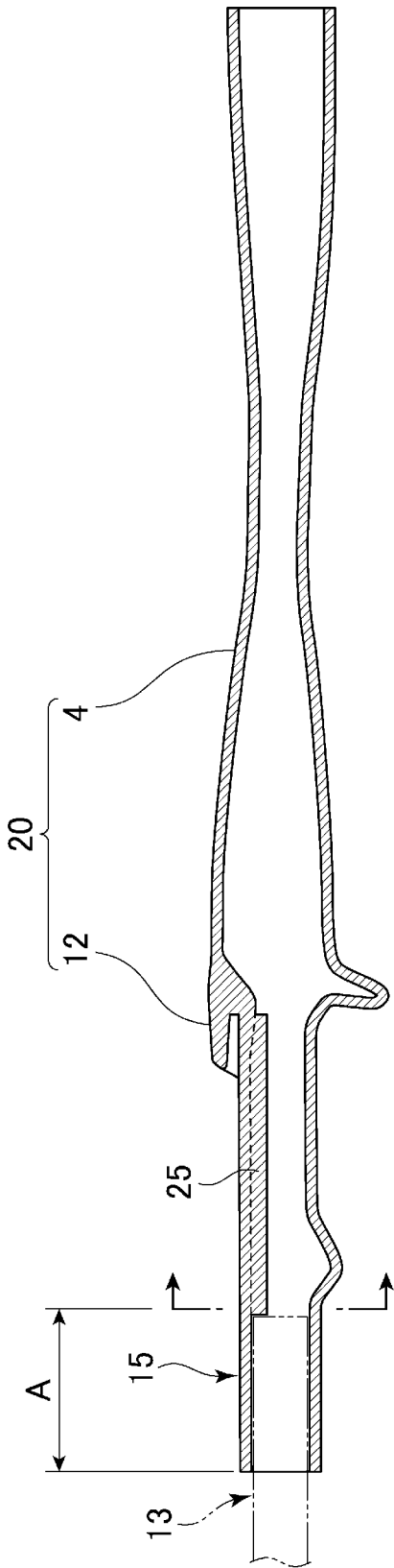
FIG. 7*a* is a view illustrating the fishing rod handle member according to the embodiment of the present disclosure.
Figure 7B:
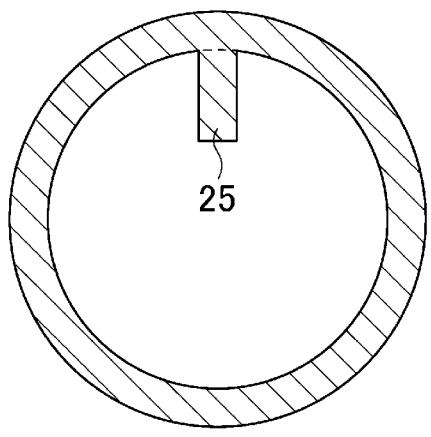
FIG. 7*b* is a view illustrating a cross section of the fishing rod handle member according to the embodiment of the present disclosure.
Figure 7C:
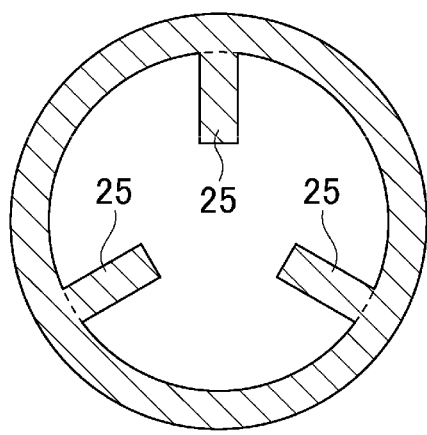
FIG. 7*c* is a view illustrating a cross section of the fishing rod handle member according to the embodiment of the present disclosure.

FIGS. 7b and 7c each illustrate a cross-sectional shape of the axial rib 25 in FIG. 7a. As illustrated in FIG. 7b, the axial rib 25 is disposed so as to protrude from an inner surface of the reel seat main body 12. Meanwhile, as illustrated in FIG. 7c, the axial ribs 25 may be disposed so as to protrude from a plurality of places on the inner surface of the reel seat main body 12 (in the illustrated example, three axial ribs 25 are disposed). Various aspects are conceivable for the position, number, shape, and structure of the axial rib 25, and the aspect of the axial rib 25 is not limited the above aspects.

Next, the fishing rod handle member 20 according to the embodiment of the present disclosure will be described with reference to FIGS. 8a to 8d. As illustrated in the drawings, in the fishing rod handle member 20 according to the embodiment of the present disclosure, the fishing rod handle member is formed in a hollow shape, but the fishing rod handle member 20 may include an axial wall 26 extending in a longitudinal direction of the reel seat main body 12 from an area where the end portion 13 of the rod body for a fishing rod 3 is attached to the one end portion 15 of the reel seat main body 12 on a side opposite to the grip 4 in the area. In this way, it is possible to significantly reduce the weight without affecting sensitivity imparted to the fishing rod and to enhance bending and crushing rigidity.

Figure 8A:
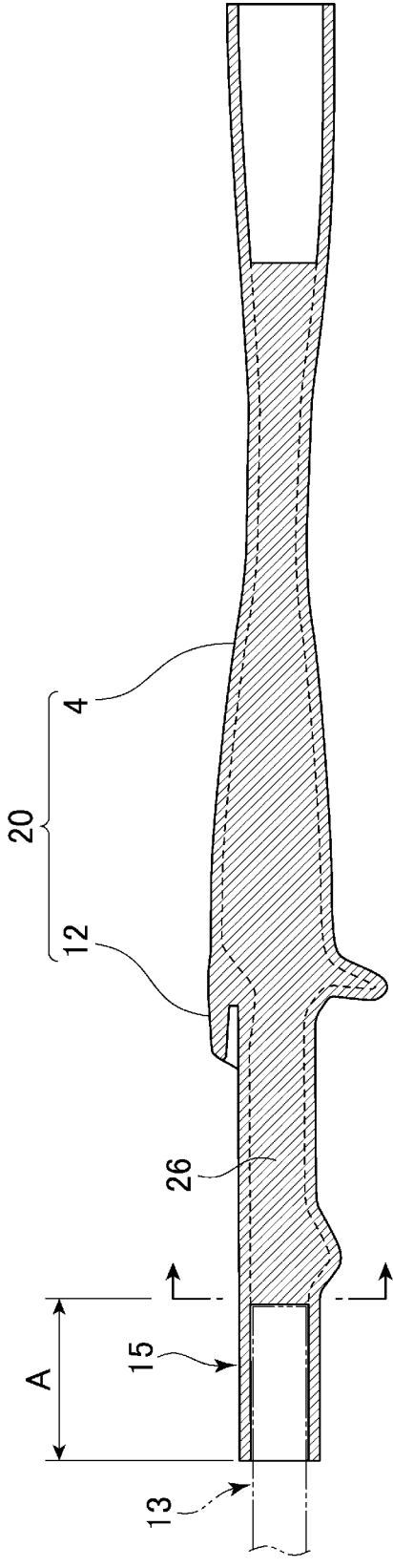
FIG. 8*a* is a view illustrating the fishing rod handle member according to the embodiment of the present disclosure.
Figure 8B:
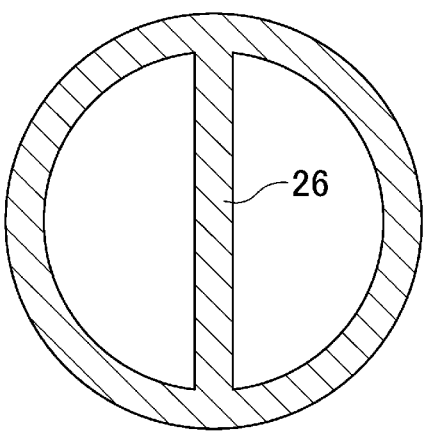
FIG. 8*b* is a view illustrating a cross section of the fishing rod handle member according to the embodiment of the present disclosure.
Figure 8C:
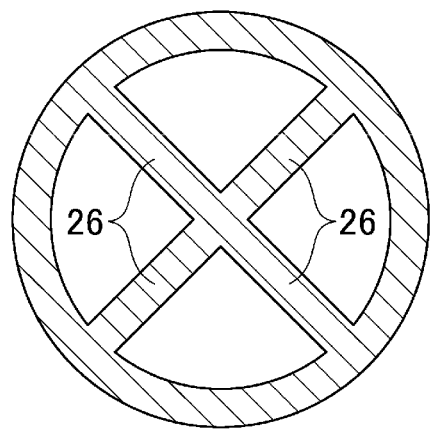
FIG. 8*c* is a view illustrating a cross section of the fishing rod handle member according to the embodiment of the present disclosure.
Figure 8D:
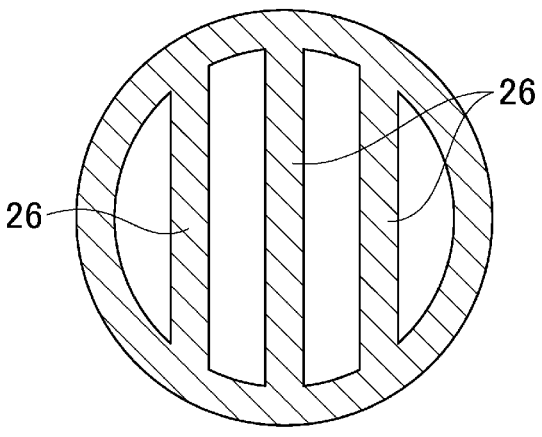
FIG. 8*d* is a view illustrating a cross section of the fishing rod handle member according to the embodiment of the present disclosure.

FIGS. 8b, 8c, and 8d each illustrate a cross-sectional shape of the axial wall 26 in FIG. 8a. As illustrated in FIG. 8b, the axial wall 26 is disposed so as to extend in one radial direction from an inner surface of the reel seat main body 12. Meanwhile, as illustrated in FIG. 8d, the plurality of axial walls 26 may be disposed so as to extend from the inner surface of the reel seat main body 12 in directions illustrated in the drawing (in the illustrated example, three axial walls 26 are disposed). As illustrated in FIG. 8c, the two axial walls 26 may extend from the inner surface of the reel seat main body 12 in one radial direction so as to cross each other. Various aspects are conceivable for the position, number, shape, and structure of the axial wall 26, and the aspect of the axial wall 26 is not limited the above aspects.

Note that the above aspects may be arbitrarily combined with each other. In addition, a part or the whole may be inclined or curved with respect to the axial direction or the circumferential direction. In addition, as for the above-described circumferential rib 23 and circumferential wall 24 each having an opening, the opening may have a shape-reinforced structure such as an elliptical shape.

In the fishing rod handle member 20 according to the embodiment of the present disclosure, carbon fibers of the carbon fiber-reinforced plastic (CFRP) are continuously formed in a longitudinal direction of the fishing rod handle member. With this configuration, it is possible to reduce the weight by ensuring bending rigidity and to transmit vibration of the rod due to contact of fish to a hand in a sensitive manner.

The fishing rod 1 according to the embodiment of the present disclosure includes the above-described fishing rod handle member 20 and the rod body 2.

The fishing rod according to the embodiment of the present disclosure can significantly reduce the weight because the handle member is integrally molded, can reduce attenuation of vibration from the rod body due to the integral molding, and therefore can improve sensitivity of the fishing rod.

The fishing rod reel seat main body 12 according to the embodiment of the present disclosure has the rod body for a fishing rod 3 attached to one end and having the fishing rod grip 4 attached to the other end, includes the reel leg placing portion 12a on which the reel leg 6a is placed, and is integrally molded as a whole. This makes it possible to reduce the weight and to increase sensitivity.

Next, a method for molding the fishing rod handle member 20 according to the embodiment of the present disclosure will be described. First, the size and shape of a core member are determined in accordance with the shape and size of the fishing rod handle member 20 (for example, the core member is offset inward by about 0.5 to 1 mm from the fishing rod handle member 20) (core member design). Using PVA, the core member (two core members in a halved state) is formed by a 3D printer in accordance with the size and shape of the core member. The two core members in a halved state are bonded to each other to assemble a core member.

Next, a carbon fiber-reinforced plastic (CFRP) preform is formed around the core member (RTM molding, AC molding, VaRTM molding, F/W molding, S/W molding, I/P molding, or the like). The preform is subjected to taping or bagging to be cured (thermal processing at 80° C. or higher is performed). Thereafter, the core member is dissolved in water (warm water, flowing water). Finally, the molded product is subjected to trimming, painting, and the like to form the fishing rod handle member 20.

The fishing rod handle member 20 according to the embodiment of the present disclosure thus formed can significantly reduce the weight because the handle member is integrally molded, can reduce attenuation of vibration from the rod body due to the integral molding, and therefore can improve sensitivity of the fishing rod.

Next, another method for molding the fishing rod handle member 20 according to the embodiment of the present disclosure will be described. First, the size and shape of a core member are determined in accordance with the shape and size of the fishing rod handle member 20 (for example, the core member is offset inward by about 0.5 to 1 mm from the fishing rod handle member 20) (core member design). Using water-soluble sand, a sand mold core member is formed in accordance with the size and shape of the core member.

Next, using carbon not impregnated with a resin, a preform is formed around the core member. Specifically, a cross material (woven fabric), a non-crimped fabric (NCF), a braid, and a UD tape can be used, but the material is not limited thereto. In addition, it is necessary to shape carbon fibers for the core member, and at this time, a binder is used to impart tackiness. Examples of the binder include, but are not limited to, an epoxy-based binder, a rosin-based binder, polyamide, polyphenylene sulfide, polyetherimide, polyethersulfone, polysulfone, polyphenylene ether, polyimide, polyamideimide, and phenoxy. Here, in the above example, the case of using carbon not impregnated with a resin has been described. However, a method for stacking and disposing a prepreg in which a carbon cloth or the like is impregnated with a resin in advance directly around the core by a hand lay-up method or the like, and performing molding (curing) may be used. The preform is set in a die, and a resin is injected thereinto (RTM molding method). Thereafter, the core member of the sand mold is removed in water. Finally, the molded product is subjected to deburring, polishing, painting, and the like to form the fishing rod handle member 20.

In such an RTM molding method, it is possible to obtain an advantage that formation of a portion not impregnated with a resin, such as a resin withering or a void, can be avoided as much as possible even in a complicated shape such as a handle by a method for pouring a low-viscosity resin. In addition, since a material having better shapability than a prepreg can be used, shaping can be performed without applying a load to fibers more than necessary even in molding of a complicated shape. Furthermore, since an outside is formed with a die and an inside is formed with a core material, there is an advantage that both the outside and the inside can be molded with desired dimensions, and a molded product having a good surface state in each of the outside and the inside can be obtained. As described above, in the RTM molding method, it is possible to stabilize the quality and to avoid insufficient strength.

Next, another method for molding the fishing rod handle member 20 according to the embodiment of the present disclosure will be briefly described. First, a die molded in accordance with the shape and size of the fishing rod handle member 20 is prepared. A prepreg is put in the mold as a preform, and pressed against an outer mold in the die with pneumatic force (internal pressure molding) to form a molded product. Thereafter, the molded product is subjected to deburring, polishing, painting, and the like to form the fishing rod handle member 20. In such an internal pressure molding method, since the prepreg is pressed against the die (outer mold) by internal pressure and molded, an outer surface of the molded product can be more favorably molded. In addition, since a molded product having a relatively small content of resin can be manufactured by using the prepreg, the weight of the product can be reduced.

The dimensions, materials, and arrangements of the components described herein are not limited to those explicitly described in the embodiment, and the components can be modified so as to have any dimensions, materials, and arrangements that can fall within the scope of the present disclosure. In addition, components not explicitly described herein can be added to the described embodiment, or some of the components described in the embodiment can be omitted.

REFERENCE SIGNS LIST

1 Fishing rod
2 Rod body
3 Base rod
4 Grip
5 Middle rod
6 Reel
6*a* Reel leg
7 Tip rod
9 Reel seat
10 Fishing line guide
12 Reel seat main body
12*a* Reel leg placing surface
13 End portion
14 Fixing hood
15 End portion
20 Fishing rod handle member
22 Moving hood
23 Circumferential rib
24 Circumferential wall
25 Axial rib
26 Axial wall
A Length of end portion area

The invention claimed is:

1. A fishing rod handle member formed by integrally molding a reel seat main body having a reel leg placing portion on which a reel leg is placed and a grip connected to the reel seat main body, wherein:
   an end portion of a rod body of a fishing rod is attached to an end portion of the reel seat main body on an opposite side of the grip, the fishing rod handle member is made of carbon fiber-reinforced plastic and has a hollow shape with a cavity that extends along a longitudinal direction of the fishing rod handle member, and
   the reel seat main body includes a rib that protrudes from an inner surface of the reel seat main body and extends radially into the cavity, wherein the rib has a longest dimension that extends in a circumferential direction of the fishing rod handle member.

2. The fishing rod handle member according to claim 1, wherein the end portion of the reel seat main body has a length of 20 to 50 mm.

3. The fishing rod handle member according to claim 2, wherein carbon fibers of the carbon fiber-reinforced plastic are continuously formed in a longitudinal direction of the fishing rod handle member.

4. A fishing rod comprising: the fishing rod handle member according to claim 1; the rod body, and a plurality of fishing line guides attached to the rod body.

5. The fishing rod handle member according to claim 1, wherein the cavity extends continuously from the grip to the reel seat main body.

6. The fishing rod handle member according to claim 1, wherein the rib abuts the end portion of the rod body.

7. The fishing rod handle member according to claim 1, wherein the end portion of the rod body is inserted into the end portion of the reel seat main body such that the inner surface of the reel seat main body abuts an outer surface of the rod body.

8. A fishing rod reel seat main body having a rod body for a fishing rod attached to one end and having a fishing rod grip attached to the other end on an opposite side of the reel seat main body, the fishing rod reel seat main body comprising a reel leg placing portion on which a reel leg is placed, wherein:
   the fishing rod reel seat main body is integrally molded as a whole,
   the fishing rod reel seat main body is made of carbon fiber-reinforced plastic and has a hollow shape with a cavity that extends along a longitudinal direction of the fishing rod reel seat main body from the grip to the reel seat main body, and
   the reel seat main body includes a rib that protrudes from an inner surface of the reel seat main body and extends radially into the cavity, wherein the rib has a longest dimension that extends in a circumferential direction of the fishing rod handle member.

9. The fishing rod reel seat main body according to claim 8, wherein the cavity extends continuously from the fishing rod grip to the fishing rod reel seat main body.

10. The fishing rod reel seat main body according to claim 8, wherein the rib abuts an end portion of the rod body.

11. The fishing rod reel seat main body according to claim 8, wherein an end portion of the rod body is inserted into the one end of the reel seat main body such that the inner surface of the reel seat main body abuts an outer surface of the rod body.

* * * * *